(12) United States Patent
Pegurri et al.

(10) Patent No.: US 12,272,133 B2
(45) Date of Patent: Apr. 8, 2025

(54) AUTOMATIC METHOD TO DETERMINE THE AUTHENTICITY OF A PRODUCT

(71) Applicant: eBay Inc., San Jose, CA (US)

(72) Inventors: Paolo Pegurri, Milan (IT); Marco Romelli, Milan (IT); Luca Losa, Milan (IT)

(73) Assignee: EBAY INC., San Jose, CA (US)

( * ) Notice: Subject to any disclaimer, the term of this patent is extended or adjusted under 35 U.S.C. 154(b) by 484 days.

(21) Appl. No.: 17/444,932

(22) Filed: Aug. 12, 2021

(65) Prior Publication Data

US 2022/0051040 A1 Feb. 17, 2022

(30) Foreign Application Priority Data

Aug. 17, 2020 (IT) ........................ 102020000020218

(51) Int. Cl.
| | |
|---|---|
| *G06V 20/80* | (2022.01) |
| *G06N 3/08* | (2023.01) |
| *G06T 7/00* | (2017.01) |
| *G06V 10/20* | (2022.01) |
| *G06V 10/94* | (2022.01) |
| *G06V 20/00* | (2022.01) |

(52) U.S. Cl.
CPC .............. *G06V 10/95* (2022.01); *G06N 3/08* (2013.01); *G06T 7/0004* (2013.01); *G06V 10/255* (2022.01); *G06V 20/80* (2022.01); *G06T 2207/20081* (2013.01); *G06T 2207/20084* (2013.01); *G06T 2207/30112* (2013.01); *G06T 2207/30124* (2013.01); *G06V 20/95* (2022.01)

(58) Field of Classification Search
None
See application file for complete search history.

(56) References Cited

U.S. PATENT DOCUMENTS

| | | | |
|---|---|---|---|
| 2017/0032285 A1* | 2/2017 | Sharma | .................... G06N 3/08 |
| 2020/0342259 A1* | 10/2020 | Jordan | .................. G06F 18/285 |

FOREIGN PATENT DOCUMENTS

| | | | | |
|---|---|---|---|---|
| CN | 110222728 | | 9/2019 | |
| EP | 3958171 | | 2/2022 | |
| WO | WO 2015-157526 A1 | | 10/2015 | |
| WO | WO-2019148729 A1 * | | 8/2019 | ......... G06K 9/00577 |
| WO | WO-2019201187 A1 * | | 10/2019 | ........... G06K 9/6282 |
| WO | WO-2020254597 A1 * | | 12/2020 | ........... G06K 9/6256 |
| WO | WO-2021068142 A1 * | | 4/2021 | ......... G06K 9/00442 |

OTHER PUBLICATIONS

Italy, Italian Search Report issued on Apr. 13, 2021 in Italian Application No. 202000020218, 7 pages with English translation.
Pham Tuyen Danh et al.: "Deep Learning-Based Fake-Banknote Detection for the Visually Impaired People Using Visible-Light Images Captured by Smart phone Cameras", IEEE Access, IEEE, USA, vol. 8, Mar. 30, 2020, pp. 63144-6316, DOI:10.1109/ACCESS. 2020.2984019.
"European Application Serial No. 21189159.3, Extended European Search Report mailed Jan. 19, 2022", 7 pgs.
"European Application Serial No. 21189159.3, Communication Pursuant to Article 94(3) EPC mailed Aug. 25, 2023", 2 pgs.

* cited by examiner

*Primary Examiner* — Idowu O Osifade
(74) *Attorney, Agent, or Firm* — SCHWEGMAN LUNDBERG & WOESSNER, P.A.

(57) ABSTRACT

The present invention relates to an automatic method to determine the authenticity of a product.

17 Claims, 13 Drawing Sheets

AUTOMATIC METHOD TO DETERMINE THE AUTHENTICITY OF A PRODUCT

RELATED APPLICATIONS

This application claims priority under 35 U.S.C. § 119 from Italian Patent Application No. 102020000020218 filed Aug. 17, 2020, entitled AUTOMATIC METHOD TO DETERMINE THE AUTHENTICITY OF A PRODUCT, which is incorporated herein by reference in its entirety.

TECHNICAL FIELD

The present invention relates to an automatic method to determine the authenticity of a product by analyzing a digital image representative of said product. More particularly, the present invention relates to an automatic method to determine the authenticity of a clothing product.

BACKGROUND ART

In the following description and in the subsequent claims, the term "clothing product" relates not only to garments but also to accessory products such as bags, belts, shoes, hats, etc.

There are various solutions to determine the authenticity of a product and they can comprise both human and automatic analysis.

Human analyses usually involve the use of experts in the field (or so-called "brand experts") who, through their knowledge and experience gained over time, are able to study a product and its characteristics to determine the originality thereof. Although such investigations are usually effective, known attempts to determine the originality of a product by hand actually entail extremely long lead times, lack of objectivity of the definition criteria and non-repeatable interpretative analyses, which result in an overall increase in the costs of carrying out such types of tests.

At the same time, there are a number of automatic systems and methods that can speed up the process to determine the originality of a product. In this context, WO2015157526, e.g., teaches how to determine the authenticity of a product by analyzing a digital image acquired with the aid of a hardware device associable with a smartphone to allow very high quality photographs to be taken and thus carry out microscopic analyses on the images. The analysis is carried out by dividing the acquired image into sub-portions and, through the application of machine learning algorithms (such as e.g. partitional clustering of the k-means type), constructing the visual vocabulary that makes it possible to track even the smallest variations in the images so as to allow the authenticity of a product to be effectively determined. Although the accuracy of this method is very high, it is mostly used by dealers who need to verify the authenticity of a large quantity of products. In fact, to verify the authenticity of a product, it is necessary to have an expensive hardware device that can be associated with one's smartphone in order to proceed to analyze the images in a microscopic way, otherwise verification with a standard smartphone would be impossible.

In areas as diverse as checking the authenticity of banknotes, publication 10.1109/ACCESS.2020.2984019 bearing the title "Deep Learning-Based Fake-Banknote Detection for the Visually Impaired People Using Visible-Light Images Captured by Smartphone Cameras" describes a method for classifying fake and genuine banknotes based on convolutional neural networks using images captured by smartphone cameras. For the construction of the training image dataset, an enhancement phase is provided in order to expand the amount of data to be sent to the neural network. In particular, the enhancement is done by cropping the edges and randomly rotating the initial dataset in order to multiply the dataset of fake and authentic banknotes. Since the banknotes are generally printed on paper, the quality of the prints is on average high. Although the few modifications carried out during enhancement (cropping and rotation) are sufficient for the training of the neural networks in order to distinguish a fake banknote from a genuine one, such enhancement would be ill-suited in the case in which the distinguishing features of the product to be classified are fixed on media other than paper such as, e.g., cloth, fabrics, leather, etc. It follows that for authentications in the clothing sector it is often necessary to perform enhancement phases by introducing more modifications in order to avoid errors in the authentication of labels which have an extremely high variability of distinguishing product features.

DESCRIPTION OF THE INVENTION

By virtue of the existing known methods and with reference to those listed above, the Applicant realized the need to implement a new automatic solution that would allow a user to know with certainty whether the clothing product (e.g. luxury) he or she owns and purchases is authentic or fake.

The Applicant surprisingly discovered that the synergistic combination of a number of skillfully organized phases makes it possible to create a method capable of determining the authenticity of a product by greatly reducing the human work of analysis, thereby being:

easily implementable without the need to analyze huge quantities of images during training;

scalable to products from different brands, avoiding complicated reprogramming and further classification, executable via a smartphone or any other device without the aid of additional hardware and without the need to comply with strict light conditions for the photographic capturing of the products to be verified.

By virtue of the above considerations, the present invention therefore relates, in one of its first aspect, to an automatic method to determine the authenticity of a product P comprising the phases of:

preparing a training dataset and a testing dataset wherein said phase of preparing comprises the following sub-phases:

supply of a plurality of source images $I_{A0}(n)$ corresponding to an authentic product and a plurality of source images $I_{F0}(m)$ corresponding to a fake product and saving said plurality of source images $I_{A0}(n)$, $I_{F0}(m)$ in said training dataset, annotation of at least one distinguishing feature DPF for each source image $I_{A0}(n)$, $I_{F0}(m)$, enrichment of said training dataset by means of a modification of said source images $I_{A0}(n)$, $I_{F0}(m)$ and generation of a plurality of training images $I_A(n')$, $I_F(m')$ wherein the attributes of said at least one distinguishing feature DPF are modified, training a neural network N, performing the analysis of an input image $I_U(k)$ representative of a product P of a user to be analyzed, querying at least one neural network N previously trained so that the latter is independently able to assign, for each attribute and/or for each distinguishing feature DPF of said input image $I_U(k)$, an authenticity index R representative of the probability of authenticity of said analyzed product P.

According to a further aspect, the present invention relates to an automatic method to determine the authenticity of a product which provides access to a verification platform, allows a user to photograph at least one image of a distinguishing feature of a product to be analyzed, and which classifies that distinguishing feature of the product by means of a machine learning algorithm previously trained for the purpose of verifying whether the product owned by the user is an authentic or fake product.

BRIEF DESCRIPTION OF THE DRAWINGS

Further characteristics and advantages of the method according to the present invention will result from the description below of preferred examples of embodiment thereof, given by way of an indicative yet non-limiting example, with reference to the attached figures, wherein.

EMBODIMENTS OF THE INVENTION

With reference to the attached figures, P globally indicates a product intended to be analyzed by the method according to the present invention.

Some embodiments of the present invention find application, in particular, in the analysis of luxury products P, the faking of which is extremely widespread. Since, however, the methods used by fakers to make the products and their labels generally do not comply with the canons and quality procedures of the original brand manufacturers, it goes without saying that the precise analysis of the distinguishing details of the products makes it possible to identify a multitude of shortcomings, errors, etc., which may refer, e.g., to geometric disproportions, differences in color, contrasts, precision of logo design, etc.

Figure 2:
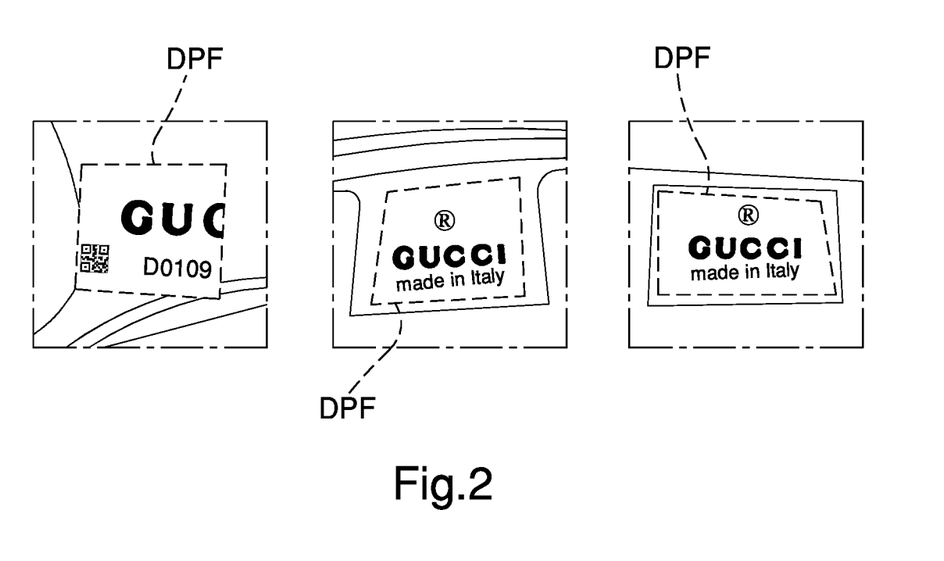
FIG. 2 represents three examples of distinguishing features of the product of FIG. 1.

As shown in the example in FIG. 2, for each product P a distinguishing feature DPF is defined a priori, which is identifiable by a label or a label detail containing, e.g., indications of origin (so-called "made in"), a logo, a code (barcode, QR code, identification code, etc.) or other details present therein that uniquely identify a given product.

In the case under examination, as will be seen later, the analysis of the images provides for the determination of the authenticity of a product such as, e.g., a bag, an item of clothing, etc., which generally has identification labels or other details present therein which univocally identify a given product. In particular, each defined distinguishing feature DPF contains a plurality of attributes which distinguish one DPF from another such as, e.g., attributes of the dimensional type, color, material, finish, color variation, font, type of printing, etc., of the product P to be analyzed.

It should be specified that the definition phase of the distinguishing features DPF of a product P is set out, for each brand, a priori by the Applicant by means of the selection and storage inside a specific database of a plurality of distinguishing features DPF of the product P.

Figure 1:
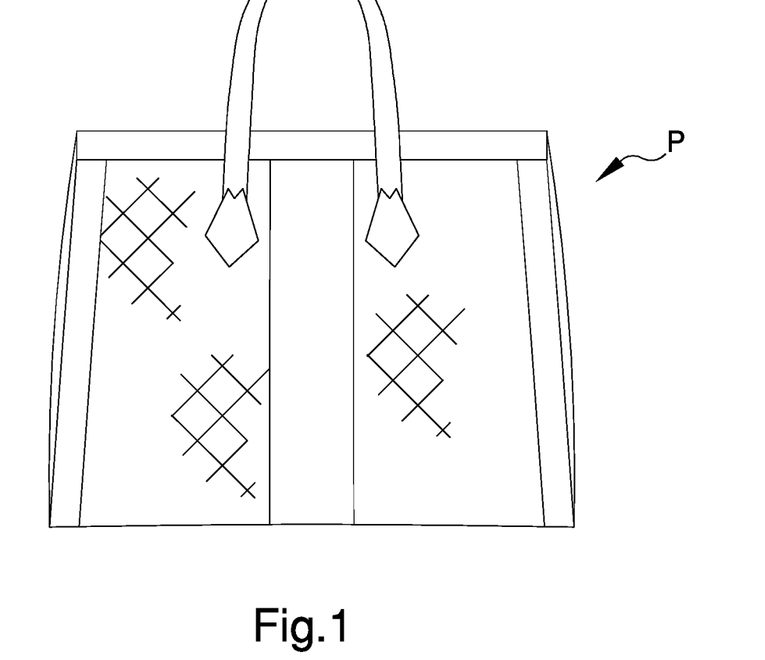
FIG. 1 represents an image of a product to be analyzed by means of the method according to the present invention.

With reference to FIGS. 1 and 2, for a bag, e.g., of the GUCCI brand, at least the following attributes associated with the distinguishing features DPF of the product P have been defined:

"GUCCI" trademark,
logo®,
QR code,
"made in Italy" wording,
label color,
unique product identifier.

Advantageously, each distinguishing feature DPF is defined according to predefined consistency, stability and/or recognizability logics so that they are, respectively:

applied to as many models as possible,
do not change over the years,
identifiable in a photograph taken with a fruition device 5 available to a user (e.g. a smartphone).

Preparation Phase

Figure 3:
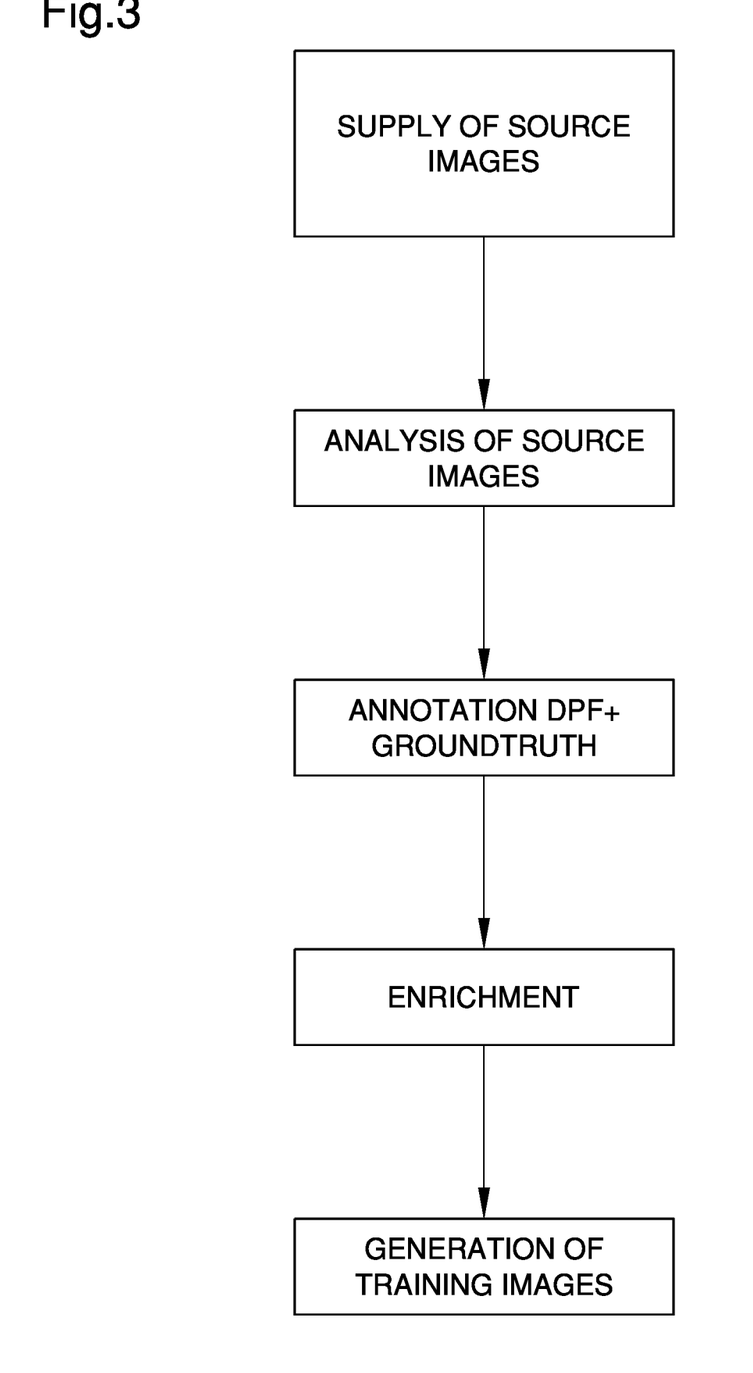
FIG. 3 represents an exemplifying block diagram of the various phases constituting the initial phase of preparation of the method of the present invention.

With reference to the example shown in FIG. 3, the determination of the authenticity of a product P comprises an initial phase of preparation of a training and testing dataset which allows the construction of the photographic archive useful for the subsequent training of one or more neural networks N, NC, ND. In detail, a phase is envisaged of supplying a first group $G_{F0}$ of source digital images $I_{F0}(n)$ containing a distinguishing feature DPF identifying a fake product P and a second group $G_{A0}$ of source digital images $I_{A0}(m)$ containing a distinguishing feature DPF identifying an authentic product P.

It must be specified that the source digital images $I_{A0}(n)$, $I_{F0}(m)$ of the groups $G_{F0}$, $G_{A0}$ containing the features DPF of the fake and authentic products P have been selected in such a way as to represent as much as possible a representative sample of the products P associated with the brands of interest actually present on the market and also selected with a level of image quality that is not too high (e.g. images made in a laboratory or in photographic studios have not been chosen) in order to simulate the image that a non-expert user would acquire by photographing autonomously, in an iterative way, his or her own product P to be verified.

Advantageously, the number of such source digital images $I_{F0}(n)$, $I_{A0}(m)$ is less than 2000, preferably between 500 and 2000 for each group $G_{F0}$, $G_{A0}$ and is sufficient, as will be seen later, to allow proper and complete training of the neural network N.

Usefully, the source digital images $I_{F0}(n)$, $I_{A0}(m)$ are stored in a specific database in signal communication with the neural network N for its subsequent training.

As shown in the example of FIG. 3, in one of the further phases of preparation, the analysis is envisaged by one or more brand experts of all the source digital images $I_{F0}(n)$, $I_{A0}(m)$ in such a way as to annotate for each source digital image $I_{F0}(n)$, $I_{A0}(m)$ an area of interest containing only one distinguishing feature DPF. In detail, the analysis therefore envisages a phase of annotation wherein the representative information of the source digital images $I_{F0}(n)$, $I_{A0}(m)$ is stored in a specific database such as, e.g., the storing of the coordinates of the specific area of interest for each source image $I_{F0}(n)$, $I_{A0}(m)$ analyzed and containing the distinguishing feature DPF. In the present case, for each source image $I_{F0}(n)$, $I_{A0}(m)$ a specific area (so-called "bounding box") is annotated which is contained in the digital image and comprising only one distinguishing feature DPF of the product P (so-called "groundtruth") and subsequently classified to determine if and which distinguishing feature DPF is representative of an authentic ("AUTHENTIC") or fake ("FAKE") product.

Usefully, the method of the present invention further comprises a phase of enrichment providing for having a predefined augmentation algorithm consisting in making small random changes to the attributes of each source digital image $I_{F0}(n)$, $I_{A0}(m)$, such as e.g. changes in rotation, brightness, focus, position, size, translations, cropping, linear and non-linear distortions, and other image processing operations for the purpose of creating and augmenting the training dataset.

According to one embodiment, the random changes comprise the phase of introducing a plurality of linear distortions to the attributes of each of said source digital images $I_{F0}(n)$, $I_{A0}(m)$ such as, e.g., zoom changes, perspective adjustments, etc.

According to a further preferred embodiment, the random changes comprise the phase of introducing a plurality of non-linear distortions to the attributes of each of said source digital images $I_{F0}(n)$, $I_{A0}(m)$ such as, e.g., sharp or wavy folds that modify the original shape of the label present in the image.

Figure 4:
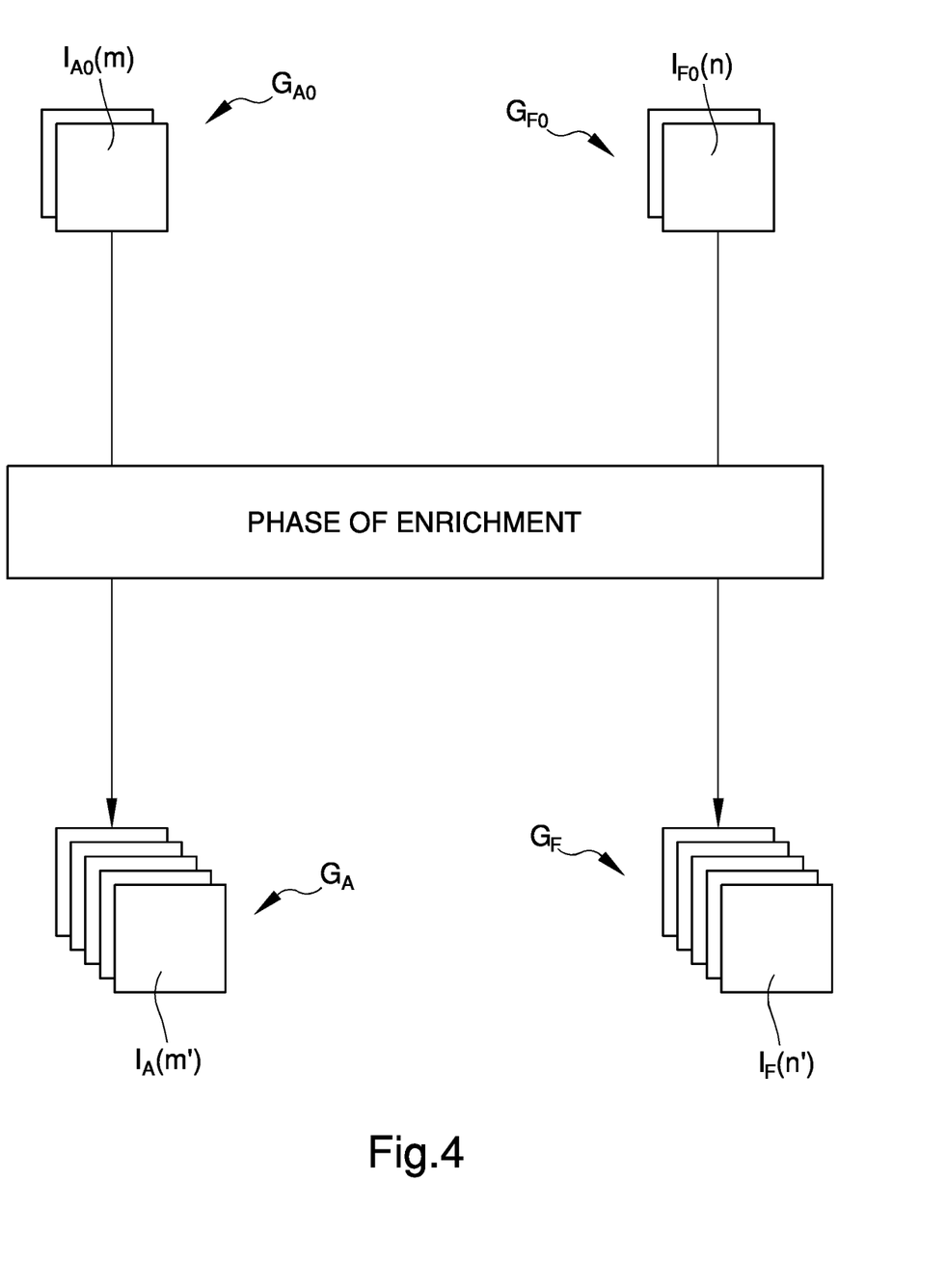
FIG. 4 represents an exemplifying diagram representative of the enrichment phase of the method of the present invention.

It follows that, as shown in the example in FIG. 4, from a relatively low number of initial source images $I_{F0}(n)$, $I_{A0}(m)$ it is possible to build an extremely ample training dataset containing a plurality of training images $I_F(n')$, $I_A(m')$ and able to represent almost the totality of the distinguishing features DPF of the images that will then have to be analyzed.

Figure 5:
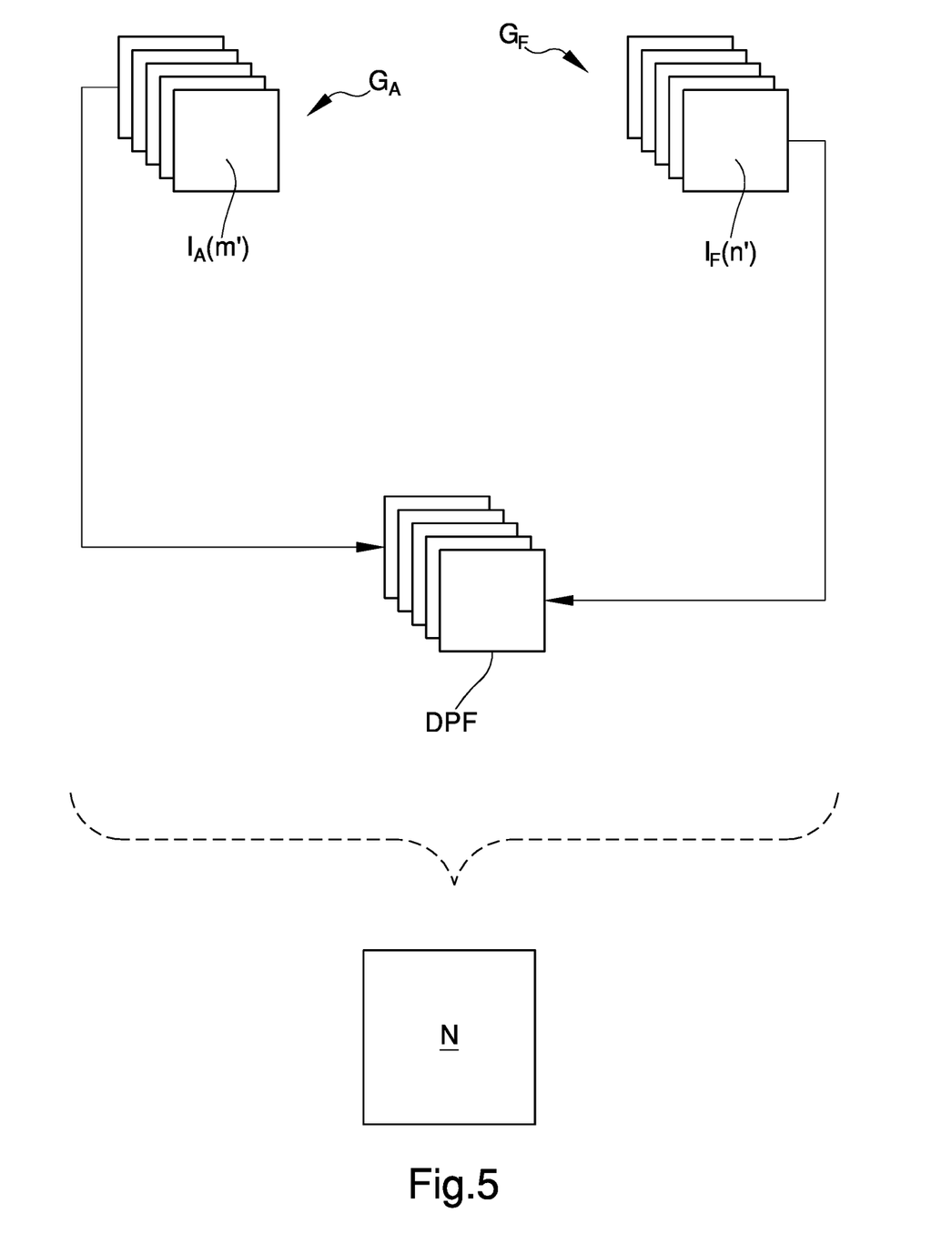
FIGS. 5 and 6 represent exemplifying diagrams representative of the performing/querying phase of the method to determine the authenticity of a product of the present invention.

As shown in the example of FIG. 5, it must be observed that in the phase of preliminary preparation to the training of the neural network N, the same neural network N is applied in an iterative manner to the training images $I_F(n')$, $I_A(m')$ in the training dataset. At each iteration phase the deviation is measured of the answers provided by the network N with respect to the expected groundtruth and the weights of the arcs of the network N are adapted on the basis of the verified deviation. The training ends when the accuracy growth curve reaches a substantially horizontal asymptote.

In one version, a testing phase is envisaged wherein the trained neural network N is applied to a testing dataset to verify that it works as expected. In detail, a phase of setting is envisaged of at least one specific threshold of accuracy SA, SF each associated to the plurality of training images identifying a fake product $I_F(n')$ and to the plurality of training images identifying an authentic product $I_A(m')$ respectively in order to ensure the utmost accuracy for all the distinguishing features DPF to be analyzed.

Training Phase

After the preparation phase, the training of the neural network N is envisaged so that the latter is autonomously able to assign, for each attribute and/or for each determined distinguishing feature DPF, the predefined threshold of accuracy S on the basis of the distribution of the analyses carried out during the preliminary phases of generation of the training digital images $I_F(n')$, $I_A(m')$ and in order to minimize possible false positives/negatives while maintaining, at the same time, a high capacity to provide an immediate response of the neural network N during the subsequent phases of execution of the method of the present invention, as will be seen in the rest of the following disclosure.

Advantageously, the training of the neural network N, aimed at learning the distinguishing features DPF as well as the attributes associated with the products P, is carried out according to predefined machine learning algorithms such as, e.g., of the gradient descent type, or working on the basis of particular intrinsic image features such as the brightness of a pixel, the grey or color levels of all or part of its pixels, etc. of the captured image. For example, each attribute can be associated with vectors/versors the values of which range from 0 to 255 according to recognition techniques using machine learning libraries in themselves known (such as Tensorflow, Keras, etc.). The training of the neural network N can also be carried out through determinative algorithms (e.g. CNN, YOLO, SSD, etc.) able to learn not only the decisional function but also the different representations of the distinguishing features DPF at different information levels.

The training is then intended to make use of the training dataset previously created in the preparation phase and containing all the information and representative associations of the identified distinguishing features DPF, as well as of the single attributes, in the training images $I_F(n)$, $I_A(n)$ which are saved in a specific database to train the neural network N.

In summary, the method according to the invention comprises a training phase of the neural network N based on the training images $I_F(n')$, $I_A(m')$ obtained from the enrichment phase and based on the distinguishing features DPF annotated and classified during the previous preparation phase.

Execution Phase

At the end of training, an execution phase is envisaged whereby it is possible to query the neural network N in order to analyze one or more input digital images $I_U(k)$ of a user in order to supply to the latter with information on the authenticity of a product P owned by him or her.

Figure 6:
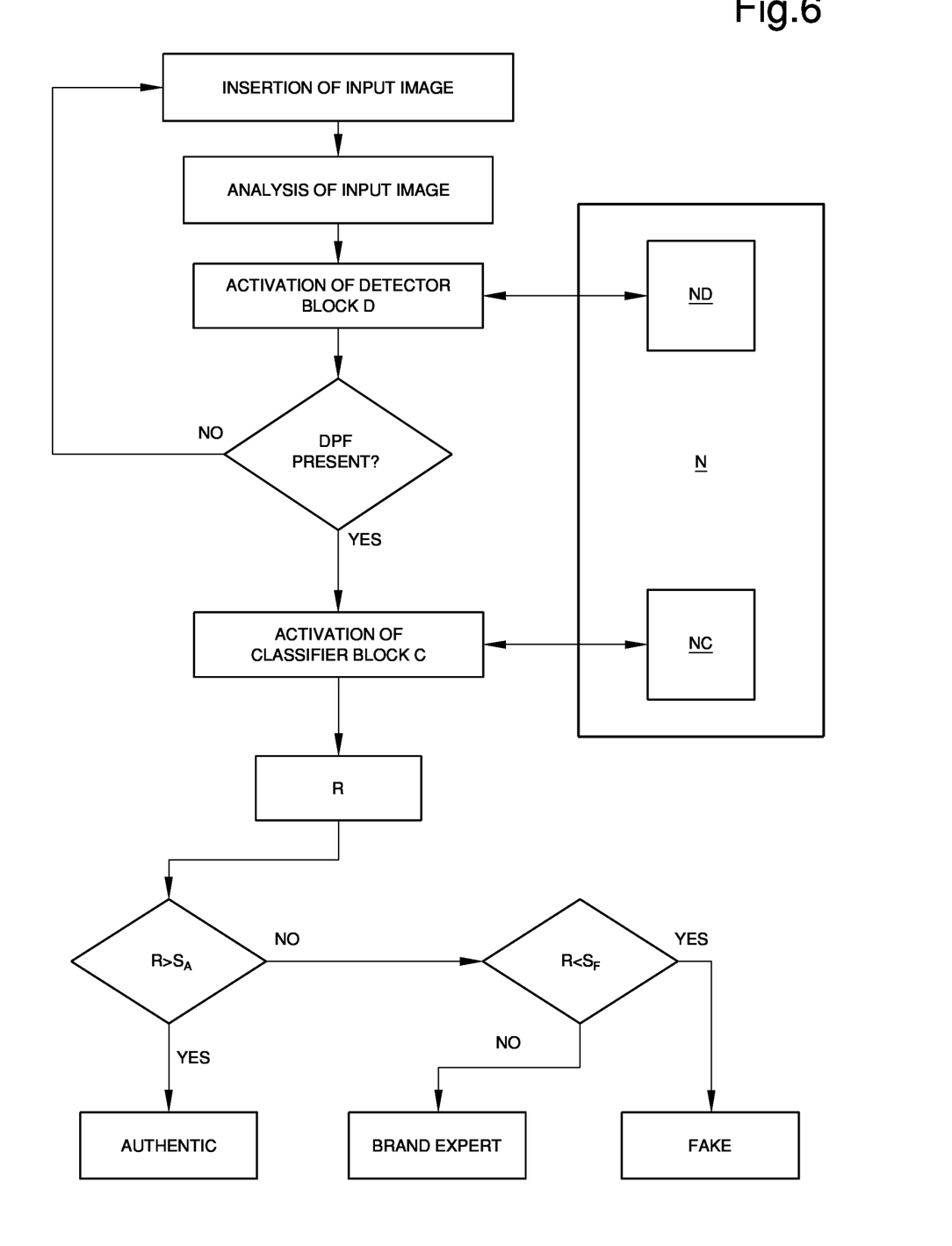
Figure 7:
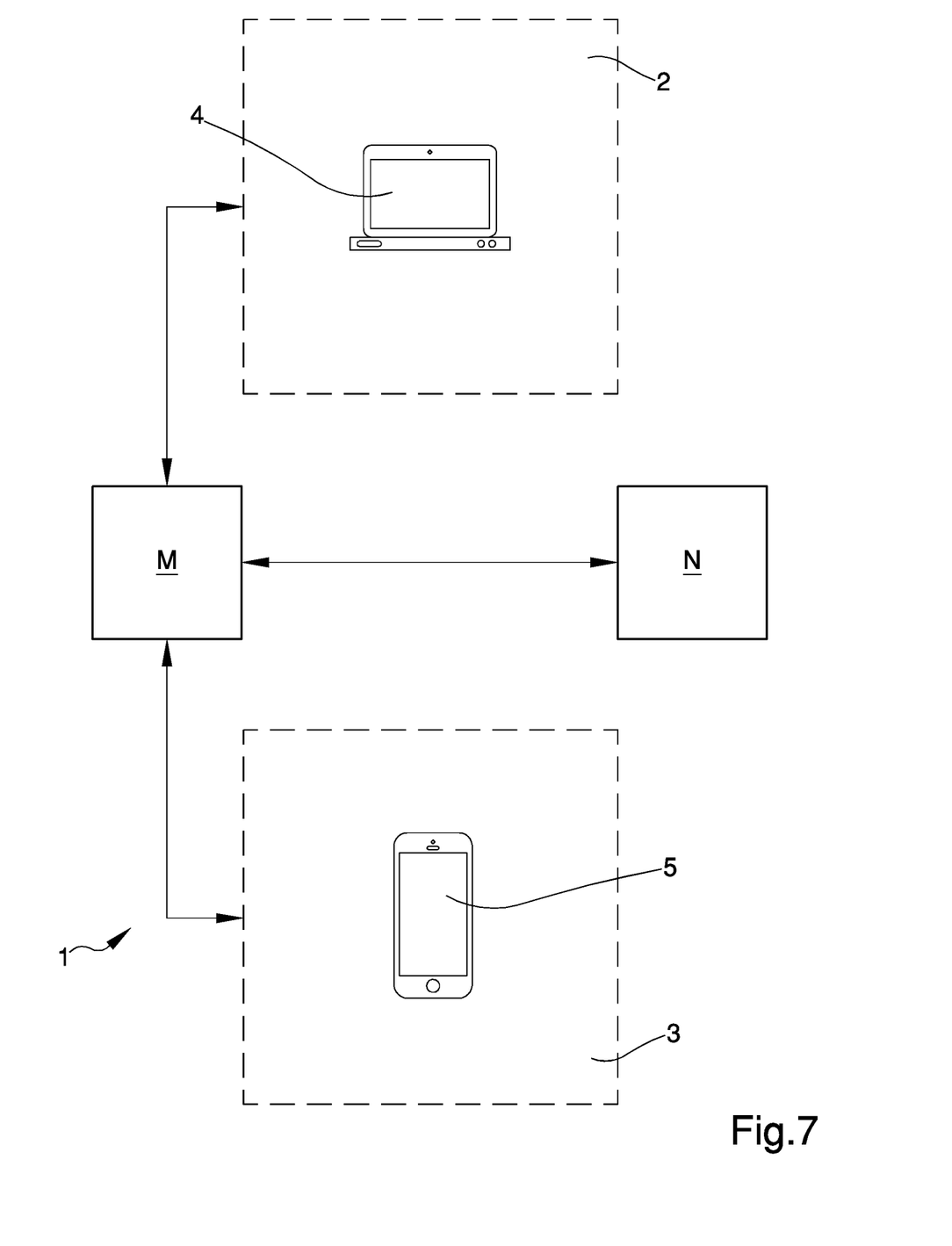
FIG. 7 represents an exemplifying diagram of the verification platform associated with the method of the present invention.
Figures 8, 9:
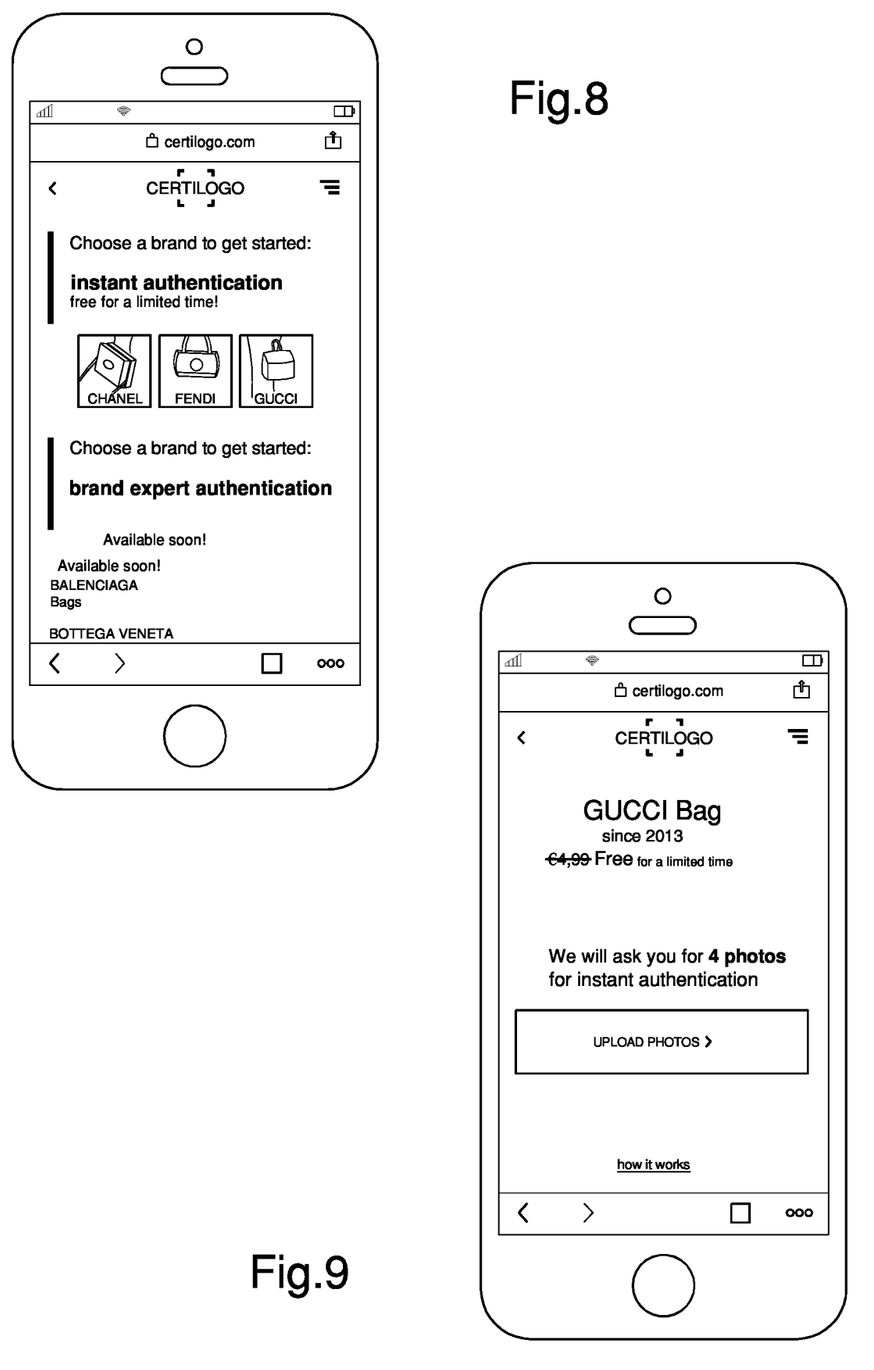
FIGS. 8-21 represent how, using a smartphone, the authenticity of a product can be verified by analyzing one or more digital input images of the product of FIG. 1.
Figures 10, 11:
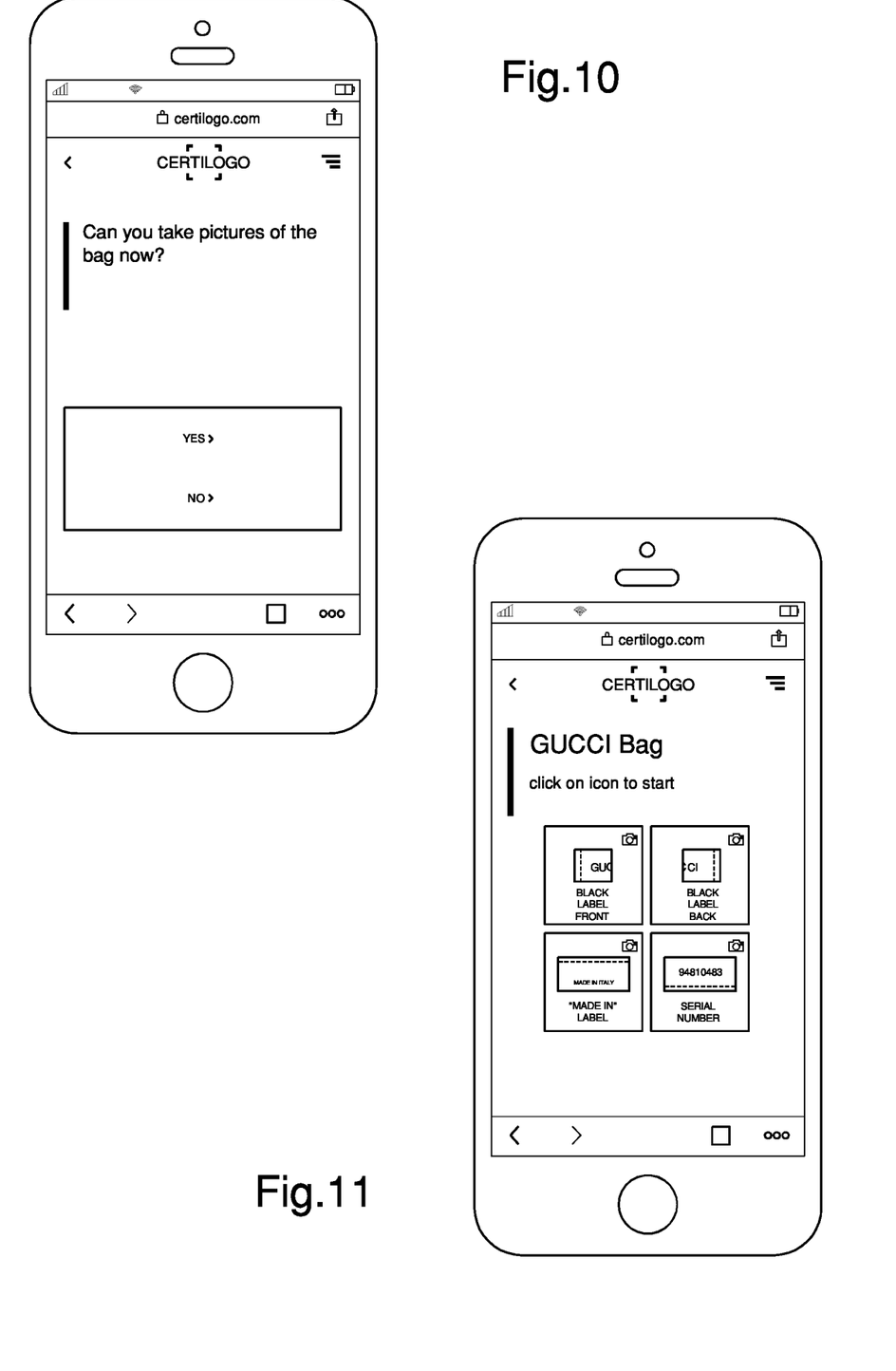
Figures 12, 13:
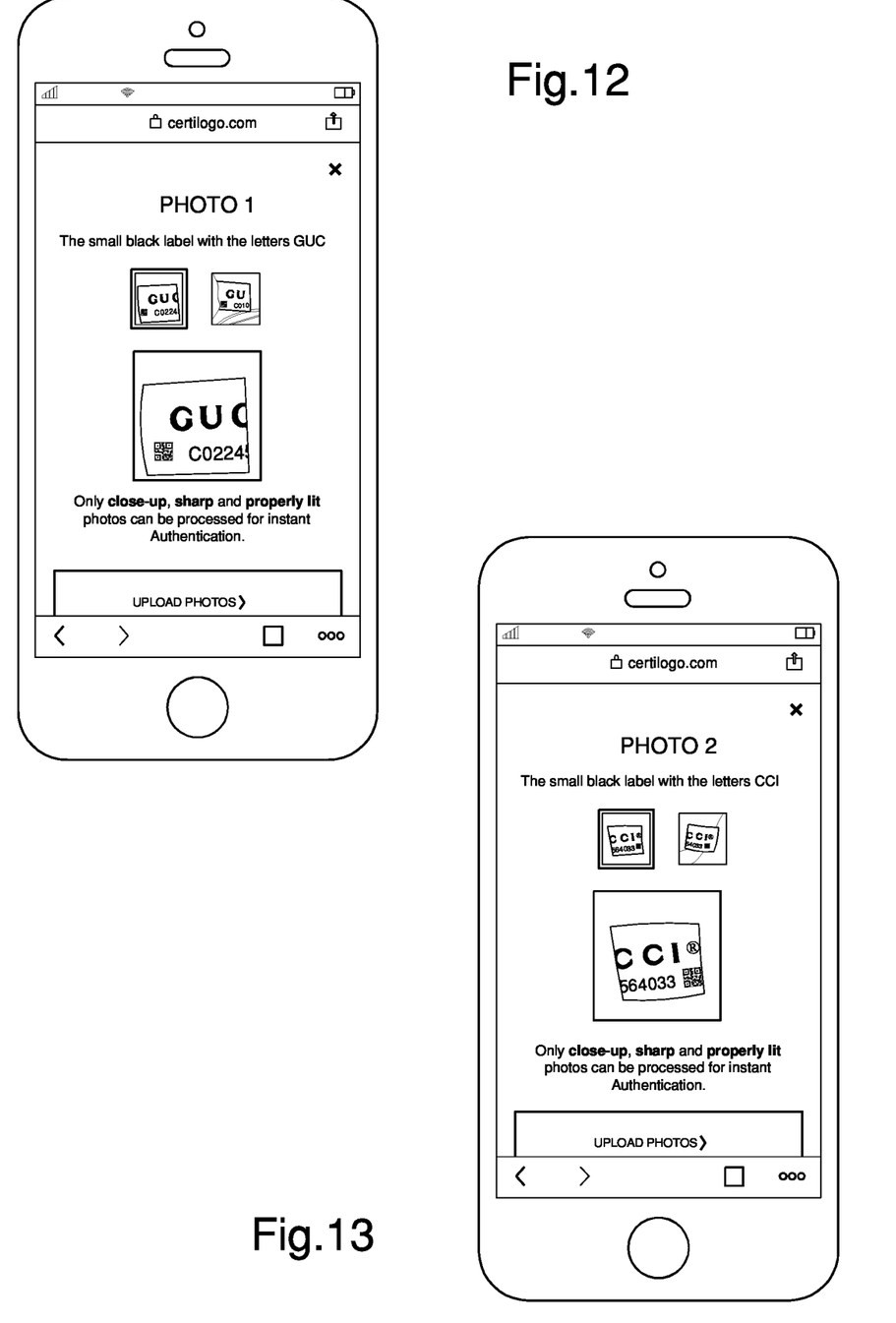
Figures 14, 15:
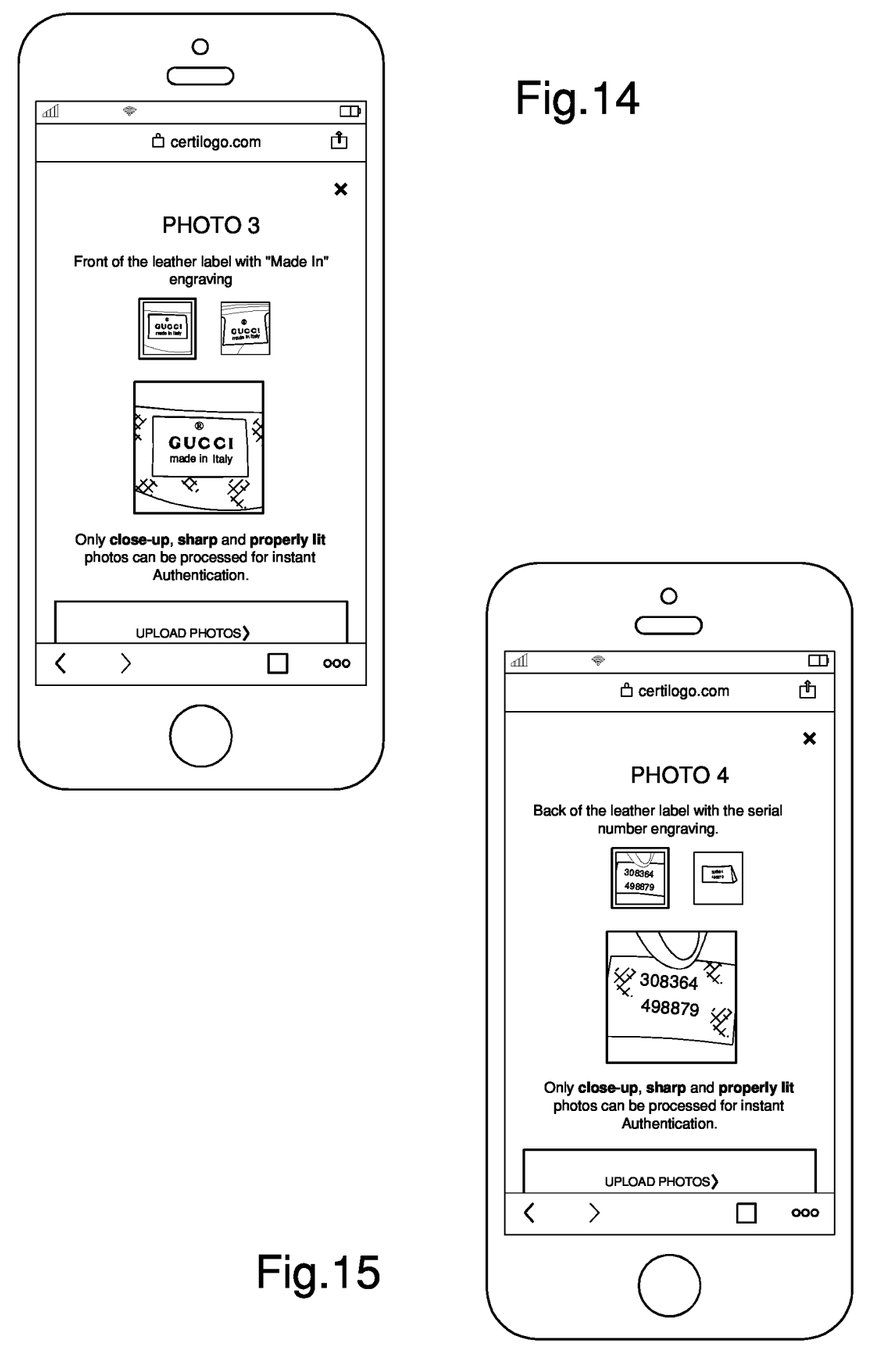
Figures 16, 17:
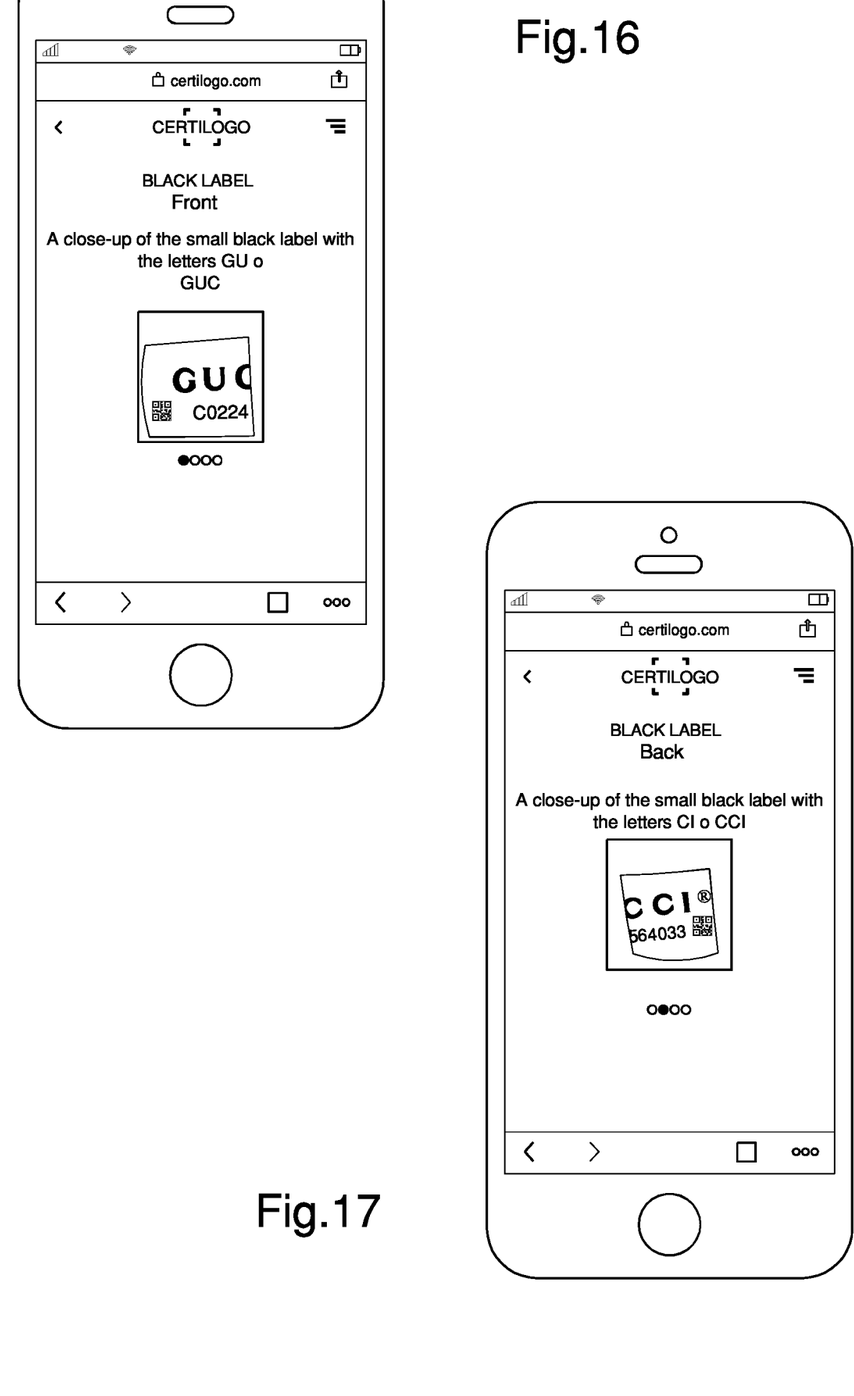
Figures 18, 19:
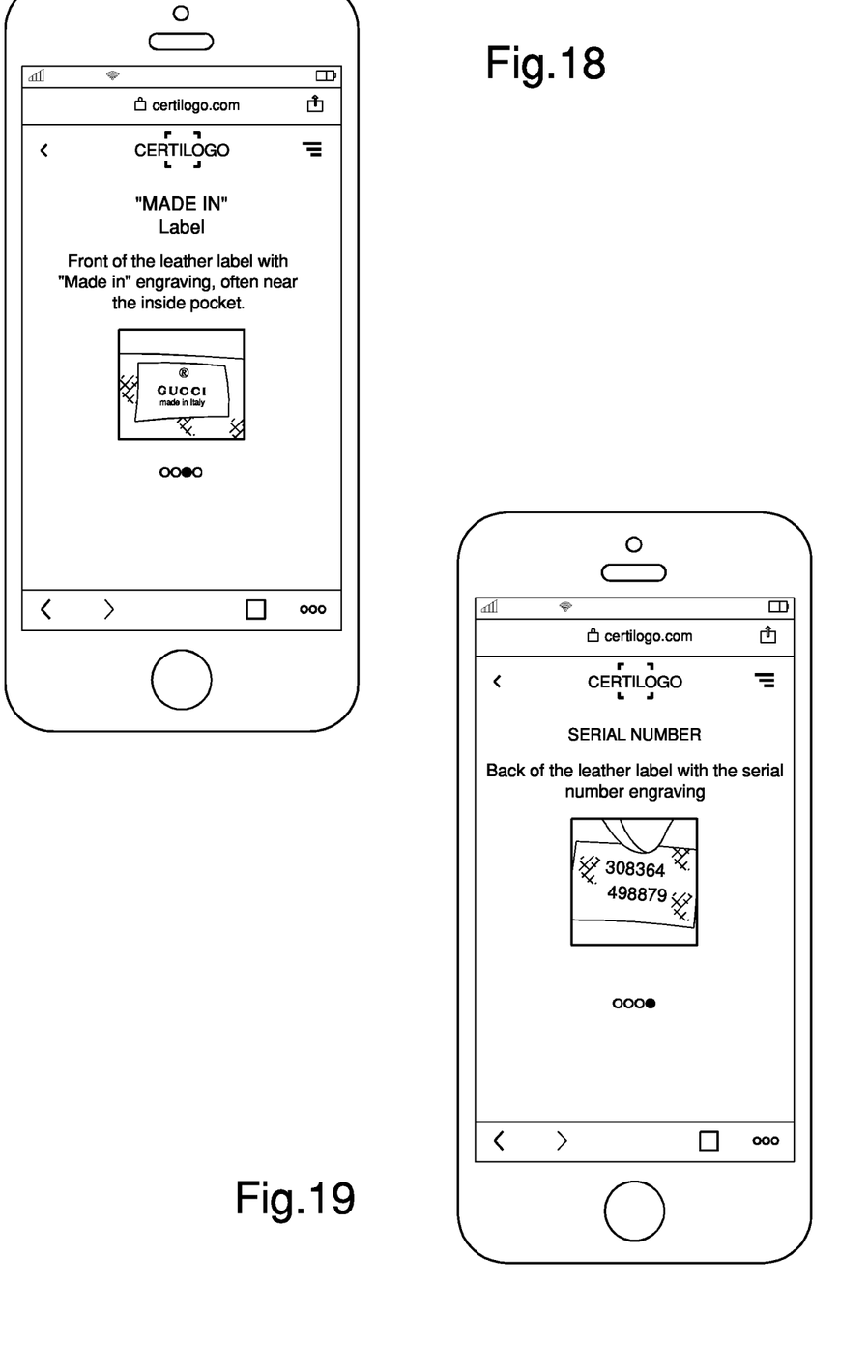
Figures 20, 21:
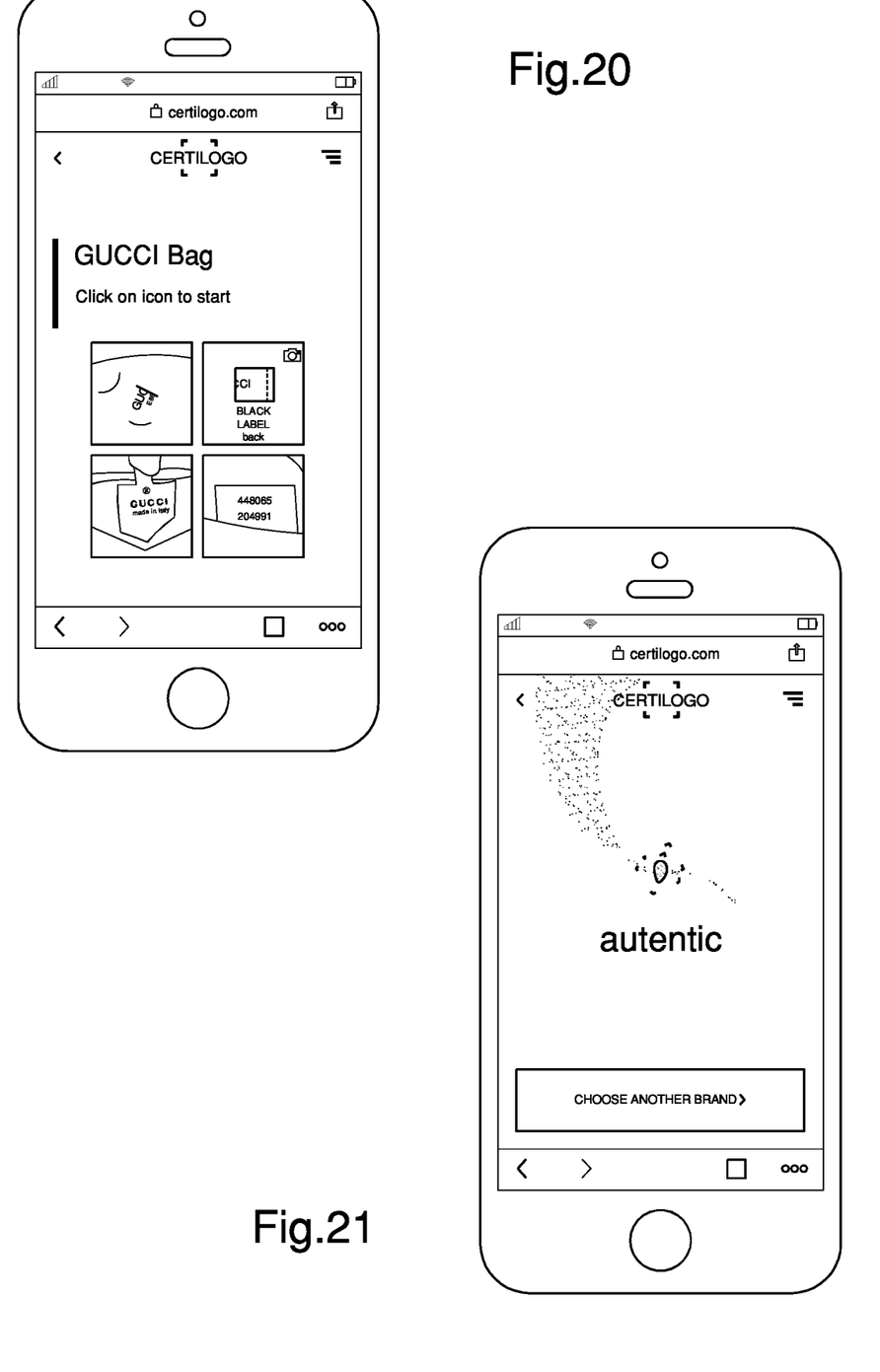

To this end, and as shown in the example of FIG. 6, the neural network N comprises a detector block D and a classifier block C. The detector block D associated with the neural network N is intended to identify all the information and associations which are representative of possible distinguishing features DPF, as well as of the individual attributes, present in the input images $I_U(k)$ to be analyzed.

In detail, the detector block D is based on a neural model, e.g. of Tensorflow origin, in particular based on a convolutional network of the Faster-RCNN-Inception-V2 type. The detector block D is configured to receive at input one or more input digital images $I_U(k)$ photographed by a user and to process at output the area of interest containing only one distinguishing feature DPF. The processing carried out by the detector block D can provide for the use of a predefined generic dataset (e.g., of the COCO type). Subsequently, a phase is provided for wherein the last layer of the network N is removed in order to carry out a phase of fine execution to learn the distinguishing features DPF coming from the previously created training and testing datasets; in particular, a graft phase is envisaged wherein the last layer is replaced with a specific predefined layer relating to the domain of interest (e.g., images of GUCCI bags, images of ARMANI bags, and so on) in the predefined generic dataset.

Furthermore, the classifier block C associated with the neural network N is configured to classify, for each input image $I_U(k)$ analyzed, the distinguishing feature DPF identified by the detector block D in order to annotate if and which distinguishing feature DPF is representative of an authentic ("AUTHENTIC") or fake ("FAKE") product.

Preferably, the classifier block C is based on a convolutional network of the VGG16 type. The classifier block C is configured to receive at input the area of interest containing the distinguishing feature DPF processed by the detector block D and to process in turn at output an authenticity index R representative of the probability of authenticity of the analyzed product P. Usefully, the removal of the last layers of the convolutional network N is carried out so the latter are substituted with a Global Average Pooling layer followed in series by a Fully Connected layer preferably equipped with an output neuron. Finally, the execution phase is performed on the basis of the distinguishing features DPF coming from the previously created training and testing datasets. In point of fact, once the knowledge of the previously created training dataset is grafted in the network N during the training phase, the dataset itself is no longer advantageously used and the network N can operate in an autonomous way.

Advantageously, the network $N_C$ associated with the classifier block C is able to associate a similarity value $S_A$, $S_F$ of the feature DPF of the analyzed image $I_U(k)$ depending on the proximity of such value to the authenticity index R, preferably, when the authenticity index R is closer to a predefined number (e.g. 1).

Preferably, the classifier block C receives the information representative of the distinguishing features DPF from the detector block D if and only if the latter have been identified in the aforementioned identification phase by the detector block D.

It should be noted that the neural network N may comprise one or more sub neural networks $N_C$, $N_D$ operating in conjunction with the detector block D and the classifier block C depending on the number of identified distinguishing features DPF.

Preferably, the detector block D and the classifier block C communicate with the previously-trained neural network N through a processor M and send to it the digital information relating to the analyses carried out on the input images $I_U(k)$. In point of fact, the neural network N is queried to determine whether each input image $I_U(k)$ received belongs to a fake product or an authentic product respectively.

According to one embodiment, the neural network N, the processor M as well as the specific databases may be mounted on a server (e.g. cloud) associated with a verification platform 1 of a type known in itself. It should be noted, however, that the database is only used during the phase of preliminary preparation to the training of the network N. During the execution phase the network N already contains all the knowledge necessary for its correct operation.

In detail, the platform 1 comprises at least one back-end subsystem 2 and one at least front-end subsystem 3 connectable to an open network, e.g. the internet (or otherwise referred to as the "web") or to a closed network, e.g. the intranet.

The back-end subsystem 2 is provided with an editing tool 4 configured to allow the platform manager to view, program, edit, etc. all data and information exchanged during training and testing and analysis of the products P. The editing tool 4 may comprise a computer, a portable electronic device, a smartphone, or any other device able to fully manage the verification platform 1.

Preferably, the back-end subsystem 2 is in signal communication with the computer M and the neural network N and the front-end subsystem 3 and manages communications between these elements by means of dedicated software, mounted on appropriate hardware (e.g. a PC) such that the manager can interact with the back-end subsystem 2 via, e.g., a browser.

Preferably, the editing tool 4 comprises a software/digital content management software.

The front-end subsystem 3 comprises at least one fruition device 5 configured to enable a user to determine the authenticity of a product P. In particular, the fruition device 5 is configured to enable the user to use the results of the analysis in visual format, e.g., via a display screen. The fruition device 5 may comprise a computer, a portable electronic device, a smartphone, or any other device capable of displaying content generated by the fruition device 5 itself and/or by the back-end subsystem 2.

The fruition device 5 may further comprise acquisition means, such as a camera, for the acquisition of photographic content of the distinguishing feature DPF of a product P of the user. In detail, if the fruition device 5 is a smartphone, the user may connect via a related app to the back-end subsystem 2 and take a photo of the distinguishing feature DPF of his or her product P for subsequent analysis or, if the fruition device 5 is a computer, the user may connect to the back-end subsystem 2 via a web browser and send a photo of his or her product P for subsequent analysis.

Advantageously, the back-end subsystem 2 is configured to receive from the fruition device 5 one or more input digital images $I_U(k)$ to be analyzed by the neural network N of the present invention.

Practical Example of Execution

In detail, with reference to the examples of FIG. 8-21, the execution phases of the method according to the invention and the procedures for the analysis of an input digital image $I_U(k)$ by means of a smartphone using the platform 1 are shown below.

In detail, a user wishing to verify whether his or her product P is authentic or fake can, by means of his or her smartphone, access the platform 1 by opening a previously installed application, or by connecting to the platform 1 by means of a web browser.

Upon opening the application (FIG. 8), it is possible to choose, through an appropriate menu, a brand related to a product P to be analyzed. If the user wants, e.g., to verify the authenticity of a GUCCI branded bag, the application instructs the user, through different examples customized for each brand, in which areas of the product to take the photo containing one and only one distinguishing feature DPF (FIGS. 8-19).

Once at least one photograph (FIG. 20) of an input digital image $I_U(k)$ has been inserted, the latter is analyzed, in the first instance, by the detector block D to check for the presence or absence of a distinguishing feature DPF.

Preferably, the user is asked to take from two to four photographic images (FIGS. 12-15) of different distinguishing features DPF.

If and only if the input digital image $I_U(k)$ has at least one distinguishing feature DPF, the classifier block C is activated by the neural network N which, in combination with the processor M, activates one of its own n-nodes (previously trained) and assigns to the distinguishing feature DPF a predefined classification of the classifier block C depending on the similarity which the input digital image $I_U(k)$ has with the training images $I_F(n)$, $I_A(n)$ previously analyzed during the training so as to attribute to each distinguishing feature DPF an authenticity index R (FIG. 6) (or so-called "weight" or "score"). If the authenticity index R is higher or lower than the specific accuracy threshold $S_A$, $S_F$, preferably set at a value of 0.8 to determine authenticity and at 0.2 to determine fake, the platform (FIG. 21) will indicate that the analyzed product P is authentic.

Otherwise, if the authenticity index R is lower than the specific accuracy threshold SF, the platform will indicate that further analysis by a brand expert is required.

Advantageously, the authenticity index R of each distinguishing feature DPF is autonomously determined by the neural network N which determines how much the value attributed for each distinguishing feature DPF of the input digital image $I_U(k)$ deviates from the value of a similar distinguishing feature DPF of the training digital images $I_F(n)$, $I_A(n)$.

Preferably, the time elapsed between loading the last input image $I_U(k)$ under analysis (FIG. 20) from one's smartphone 5 to the result of the analysis (FIG. 21) is less than 3 seconds.

As has been verified in the present description, it has been ascertained that the invention described herein achieves the intended objects, and in particular the fact is underlined that by means of the method described herein it is possible to determine, with extreme accuracy, the authenticity of a product in an automatic and quick way and without the need for the user to indicate the type of product being analyzed.

Fine Tuning

Furthermore, thanks to the innovative phase of execution, it is possible to use the same input images $I_U(k)$ of the users to continuously train the neural network N (so-called "fine tuning") while using the platform. The effectiveness of the recognition of the products thus improves over time, speeding up the determination of the type of product chosen and ensuring highly performing recognition. Several tests carried out by the Applicant have also shown a metric accuracy of 99.8% (so-called AUC: Area Under the Curve) and more in determining the authenticity of a product P photographed by a user.

Finally, it should be noted that if the neural network N is not sure of providing an accurate result, it is always possible to interrogate a brand expert so that the determination of the authenticity of a product is always ensured.

Finally, thanks to the present invention, it is not necessary to have high quality images both during training and during analysis, and the uses and combination of the various phases of the platform are potentially endless, and obviously a technician in the field, in order to satisfy contingent and specific needs, may make numerous modifications and variations to the method described above, all of which are contained within the scope of protection of the invention, as defined by the following claims.

The invention claimed is:

1. An automatic method to determine authenticity of a product (P), the method comprising:
    preparing a training dataset, the preparing comprising:
        accessing a plurality of source images ($I_{A0}(m)$) corresponding to an authentic product and a plurality of source images ($I_{F0}(n)$) corresponding to a fake product,
        annotating an area comprising a distinguishing feature (DPF) of the authentic product or the fake product in each of the source images ($I_{A0}(m)$, $I_{F0}(n)$), and
        enriching the training dataset by modifying each of the source images ($I_{A0}(m)$, $I_{F0}(n)$) using a predefined augmentation algorithm to generate a plurality of training images ($I_A(m')$, $I_F(n')$), the modifying comprising the predefined augmentation algorithm making small random changes to one or more attributes of the distinguishing feature (DPF) of each of the source images, the small random changes including one or more non-linear distortions that change an original shape of an object associated with the distinguishing feature (DFP) within at least some of the source images ($I_{A0}(m)$, $I_{F0}(n)$);
    training at least one neural network with the training dataset;
    accessing an input image ($I_U(k)$) representative of the product (P) of a user to be analyzed; and
    querying the at least one neural network (N) previously trained so that the latter is independently able to assign, for each attribute and/or for each distinguishing feature (DPF) of the input image ($I_U(k)$), an authenticity index (R) representative of a probability of authenticity of the analyzed product (P).

2. The method of claim 1, wherein the number of the plurality of source images ($I_{A0}(m)$, $I_{F0}(n)$) is less than 2000.

3. The method of claim 1, wherein the annotating comprises storing an area of interest containing only one distinguishing feature (DPF) for each source image ($I_{A0}(m)$, $I_{F0}(n)$).

4. The method of claim 1, further comprising classifying whether and which distinguishing feature (DPF) is representative of an authentic or counterfeit product (P).

5. The method of claim 1, wherein the neural network (N) is trained on the basis of the training images ($I_A(m')$, $I_F(n')$) and on the basis of the distinguishing features (DPF) noted and classified during the preparing of the training dataset.

6. The method of claim 1, wherein the querying the at least one neural network (N) comprises:
    having an individual detector block (D) associated with the neural network (N) intended to identify at least one distinguishing feature (DPF) in the input image ($I_U(k)$) to be analyzed; and
    having a classifier block (C) associated with the neural network (N) and intended to classify the distinguishing feature (DPF) identified by the detector block (D) in order to associate a similarity value ($S_A$, $S_F$) of the feature (DPF) of the analyzed input image ($I_U(k)$) depending on a proximity of such a value to said authenticity index (R).

7. The method of claim 6, wherein the classifier block (C) receives the information representative of the distinguishing features (DPF) if and only if the latter have been identified by the detector block (D).

8. The method of claim 1, further comprising:
    causing presentation of a user interface that provides instructions that include one or more areas of the product (P) in which to take a photo containing the distinguishing feature (DPF), wherein the photo comprises the input image ($I_U(k)$).

9. The method of claim 1, wherein the one or more non-linear distortions comprises a sharp or wavy fold that change the original shape of the object within at least some of the source images ($I_{A0}(m)$, $I_{F0}(n)$).

10. An automatic method to determine the authenticity of a product (P), the method comprising:
    accessing a verification platform (1);
    photographing at least one input image ($I_U(k)$) representative of the product (P) of a user to be analyzed and containing at least one distinguishing feature (DPF); and
    querying at least one previously trained neural network (N) so that the latter is independently able to verify whether the at least one distinguishing feature (DPF) of the at least one input image ($I_U(k)$) belongs to an authentic or counterfeit product (P), the neural network (N) trained using an enriched training dataset that is enriched by using a predefined augmentation algorithm to generate a plurality of training images by making small random changes to one or more attributes of a distinguishing feature comprised within an annotated area of each source image, the small random changes including introducing one or more non-linear distortions that change an original shape of an object within at least some of the source images.

11. A system comprising:
one or more processors that executes instructions to perform operations comprising:
  preparing a training dataset, the preparing comprising:
    accessing a plurality of source images ($I_{A0}(m)$) corresponding to an authentic product and a plurality of source images ($I_{F0}(n)$) corresponding to a fake product,
    annotating an area comprising a distinguishing feature (DPF) of the authentic product or the fake product in each of the source images ($I_{A0}(m)$, $I_{F0}(n)$), and
    enriching the training dataset by modifying each of the source images ($I_{A0}(m)$, $I_{F0}(n)$) using a predefined augmentation algorithm to generate a plurality of training images ($I_A(m')$, $I_F(n')$), the modifying comprising the predefined augmentation algorithm making small random changes to one or more attributes of the distinguishing feature (DPF) of each of the source images ($I_{A0}(m)$, $I_{F0}(n)$), the small random changes including one or more non-linear distortions that change an original shape of an object associated with the distinguishing feature (DFP) within at least some of the source images;
  training at least one neural network with the training dataset;
  accessing an input image ($I_U(k)$) representative of the product (P) of a user to be analyzed; and
  querying the at least one neural network (N) previously trained so that the latter is independently able to assign, for each attribute and/or for each distinguishing feature (DPF) of the input image ($I_U(k)$), an authenticity index (R) representative of a probability of authenticity of the analyzed product (P).

12. The system of claim 11, wherein the number of the plurality of source images ($I_{A0}(m)$, $I_{F0}(n)$) is less than 2000.

13. The system of claim 11, wherein the annotating comprises storing an area of interest containing only one distinguishing feature (DPF) for each source image ($I_{A0}(m)$, $I_{F0}(n)$).

14. The system of claim 11, wherein the operations further comprise classifying whether and which distinguishing feature (DPF) is representative of an authentic or counterfeit product (P).

15. The system of claim 11, wherein the neural network (N) is trained on the basis of the training images ($I_A(m')$, $I_F(n')$) and on the basis of the distinguishing features (DPF) noted and classified during the preparing of the training dataset.

16. The system of claim 11, wherein the querying the at least one neural network (N) comprises:
  having an individual detector block (D) associated with the neural network (N) intended to identify at least one distinguishing feature (DPF) in the input image ($I_U(k)$) to be analyzed; and
  having a classifier block (C) associated with the neural network (N) and intended to classify the distinguishing feature (DPF) identified by the detector block (D) in order to associate a similarity value ($S_A$, $S_F$) of the feature (DPF) of the analyzed input image ($I_U(k)$) depending on a proximity of such a value to said authenticity index (R).

17. The system of claim 16, wherein the classifier block (C) receives the information representative of the distinguishing features (DPF) if and only if the latter have been identified by the detector block (D).

* * * * *